United States Patent
Xing et al.

(10) Patent No.: US 8,148,967 B2
(45) Date of Patent: Apr. 3, 2012

(54) PWM CLOCK GENERATION SYSTEM AND METHOD TO IMPROVE TRANSIENT RESPONSE OF A VOLTAGE REGULATOR

(75) Inventors: Kun Xing, Cary, NC (US); Greg J. Miller, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 430 days.

(21) Appl. No.: 12/490,752

(22) Filed: Jun. 24, 2009

(65) Prior Publication Data
US 2010/0033153 A1  Feb. 11, 2010

Related U.S. Application Data

(60) Provisional application No. 61/086,354, filed on Aug. 5, 2008.

(51) Int. Cl.
*G05F 1/00* (2006.01)
(52) U.S. Cl. .................... 323/288; 323/282; 323/284
(58) Field of Classification Search .................. 323/268, 323/271, 272, 282, 283, 284, 288, 351
See application file for complete search history.

(56) References Cited

U.S. PATENT DOCUMENTS

| | | |
|---|---|---|
| 4,413,224 A | 11/1983 | Krupka et al. |
| 4,521,726 A | 6/1985 | Budnik |
| 4,658,204 A | 4/1987 | Goodwin |
| 4,801,859 A | 1/1989 | Dishner |
| 5,399,958 A | 3/1995 | Iyoda |
| 5,514,947 A | 5/1996 | Berg |
| 5,705,919 A | 1/1998 | Wilcox |
| 5,731,694 A | 3/1998 | Wilcox et al. |
| 5,747,977 A | 5/1998 | Hwang |
| 5,760,495 A | 6/1998 | Mekanik |
| 5,770,940 A | 6/1998 | Goder |

(Continued)

FOREIGN PATENT DOCUMENTS
DE  3343883  6/1984
(Continued)

OTHER PUBLICATIONS

Hara, N. et al. "Realization and Analysis of a New Switched-Capacitor Coilless Powersupply for One-Chip IC Implementation." Systems & Computers in Japan, Wiley, Hoboken, NJ, US. vol. 29, No. 12. Nov. 15, 1998 pp. 19-33. XP000821933.

*Primary Examiner* — Adolf Berhane
*Assistant Examiner* — Lakaisha Jackson
(74) *Attorney, Agent, or Firm* — Gary R. Stanford (57) ABSTRACT

A pulse control clock generator for a voltage regulator including a comparator, a window circuit, a filter circuit, a ramp circuit, and a current circuit. The comparator compares a ramp voltage with a compensation voltage and provides a corresponding pulse control signal. The compensation voltage is indicative of output voltage error. The window circuit adds a window voltage to the compensation voltage to provide a hysteretic voltage. The filter circuit filters the hysteretic voltage to provide a filtered hysteretic voltage, such that a difference between the compensation voltage and the filtered hysteretic voltage is reduced in response to a load increase. The ramp circuit provides a repetitive ramp voltage which ramps between the filtered hysteretic voltage and the compensation voltage based on the pulse control signal. The current circuit increases a slope of the ramp voltage in response to the load increase.

20 Claims, 3 Drawing Sheets

U.S. PATENT DOCUMENTS

| | | |
|---|---|---|
| 5,959,853 A | 9/1999 | Kos |
| 6,064,187 A | 5/2000 | Redl et al. |
| 6,147,478 A | 11/2000 | Skelton et al. |
| 6,147,526 A | 11/2000 | Skelton et al. |
| 6,166,527 A | 12/2000 | Dwelley et al. |
| 6,246,222 B1 | 6/2001 | Nilles et al. |
| 6,271,650 B1 | 8/2001 | Massie et al. |
| 6,307,360 B1 | 10/2001 | Kajiwara et al. |
| 6,362,607 B1 | 3/2002 | Wickersham et al. |
| 6,433,525 B2 | 8/2002 | Muratov et al. |
| 6,456,050 B1 | 9/2002 | Agiman |
| 6,495,995 B2 | 12/2002 | Groom et al. |
| 6,583,610 B2 | 6/2003 | Groom et al. |
| 6,791,306 B2 | 9/2004 | Walters et al. |
| 6,819,577 B1 | 11/2004 | Wiktor et al. |
| 6,825,644 B2 | 11/2004 | Kernahan et al. |
| 6,841,983 B2 | 1/2005 | Thomas |
| 6,922,044 B2 | 7/2005 | Walters et al. |
| 7,019,502 B2 | 3/2006 | Walters et al. |
| 7,019,504 B2 * | 3/2006 | Pullen et al. .............. 323/283 |
| 7,106,036 B1 | 9/2006 | Collins |
| 7,116,568 B1 | 10/2006 | Birchenough |
| 7,132,820 B2 | 11/2006 | Walters et al. |
| 7,193,396 B2 | 3/2007 | Orr |
| 7,391,190 B1 | 6/2008 | Rajagopalan |
| 7,394,231 B2 | 7/2008 | Flatness et al. |
| 7,432,689 B2 | 10/2008 | Miller et al. |
| 7,495,419 B1 | 2/2009 | Ju |
| 7,570,033 B1 | 8/2009 | Ju |
| 7,598,715 B1 | 10/2009 | Hariman et al. |
| 7,696,735 B2 | 4/2010 | Oraw et al. |
| 7,737,668 B2 | 6/2010 | Oswald et al. |
| 7,768,246 B2 * | 8/2010 | Huang et al. .............. 323/282 |
| 7,786,712 B2 | 8/2010 | Williams |
| 7,834,608 B2 | 11/2010 | Cheng et al. |
| 7,932,709 B1 | 4/2011 | Ling |
| 2001/0035745 A1 | 11/2001 | Muratov et al. |
| 2003/0142519 A1 | 7/2003 | Walters et al. |
| 2004/0090804 A1 | 5/2004 | Lipcsei et al. |
| 2004/0196095 A1 | 10/2004 | Nonaka |
| 2009/0033289 A1 | 2/2009 | Xing et al. |
| 2009/0033293 A1 | 2/2009 | Xing et al. |
| 2009/0102440 A1 | 4/2009 | Coles |
| 2010/0026263 A1 | 2/2010 | Moussaoui et al. |
| 2010/0123446 A1 | 5/2010 | Cheng et al. |

FOREIGN PATENT DOCUMENTS

| | | |
|---|---|---|
| DE | 4206478 | 9/1993 |
| EP | 0650250 | 4/1995 |
| EP | 0883051 | 12/1998 |
| EP | 1073187 | 1/2001 |
| FR | 2610149 | 7/1988 |
| WO | WO 03065558 | 8/2003 |

\* cited by examiner

FIG. 4
(STEADY STATE)

FIG. 5
(WITHOUT 209 & 213)

FIG. 6
(WITH 209 & 213)

US 8,148,967 B2

PWM CLOCK GENERATION SYSTEM AND METHOD TO IMPROVE TRANSIENT RESPONSE OF A VOLTAGE REGULATOR

CROSS-REFERENCE TO RELATED APPLICATIONS

This application claims the benefit of U.S. Provisional Application Ser. No. 61/086,354, filed on Aug. 5, 2008, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure relates to power supply circuits, and more particularly, to a system and method for generating a pulse control clock to improve transient response of a voltage regulator. The regulator may be single phase or multiple phase (multiphase). The voltage regulator is any one of multiple types, such as, for example, a synthetic ripple regulator. The circuitry described herein is useful, for example, for the pulse control clock generation within a multiphase synthetic ripple voltage regulator such as that disclosed in U.S. Pat. No. 7,019,502, issued Mar. 28, 2006, entitled "SYNCHRONIZATION OF MULTI-PHASE SYNTHETIC RIPPLE VOLTAGE REGULATOR" and U.S. Pat. No. 6,922,044, issued Jul. 26, 2005, entitled "SYNCHRONIZATION OF MULTI-PHASE SYNTHETIC RIPPLE VOLTAGE REGULATOR," which are each incorporated herein by reference. It is advantageous to improve the response time while reducing the time delay of a voltage regulator controller. It is advantageous to provide a satisfactory transient performance with reduced output capacitance of a voltage regulator to reduce system cost.

Figure 1:
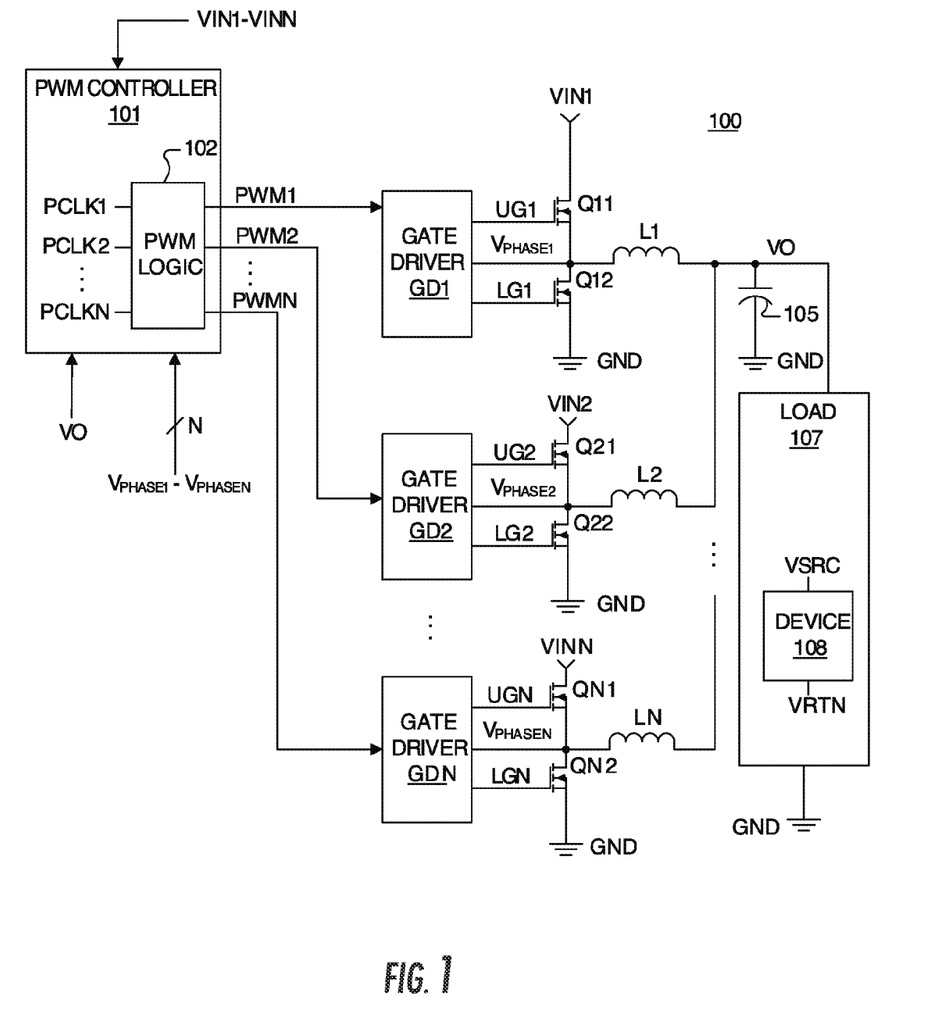
FIG. 1 is a simplified schematic and block diagram of a multiphase voltage regulator implemented according to an exemplary embodiment.

FIG. 1 is a simplified schematic and block diagram of a multiphase voltage regulator 100 implemented according to an exemplary embodiment. The multiphase regulator 100 includes a pulse width modulation (PWM) controller 101, which provides a number "N" of PWM signals PWM1, PWM2, ..., PWMN to respective N gate drivers GD1, GD2, ..., GDN forming N channels for the regulator 100. The number N is any positive integer greater than one, including N=2 for a two-phase configuration. For the first channel, the PWM1 signal is provided to the first gate driver GD1, which controls the turn-on and turn-off of a pair of electronic power switching devices or switches Q11 and Q12. In particular, the gate driver GD1 generates an upper gate switching signal UG1 provided to the control terminal (e.g., gate) of the upper (or high side) switch Q11 and generates a lower gate switching signal LG1 provided to the control terminal of the lower (or low side) switch Q12. In the particular configuration shown, the switches Q11 and Q12 are depicted as N-channel metal-oxide semiconductor field-effect transistors (MOSFETs) having their drain-source current paths coupled in series between a pair of input power supply terminals. Other types of electronic switching devices are contemplated. In the configuration shown, the input power supply terminals provide an input voltage VIN1 referenced to ground (GND). The drain of switch Q12 is coupled to the source of switch Q11 at a phase node $V_{PHASE1}$, which is coupled to one end of an output inductor L1. The other end of the inductor L1 is coupled to a common output node VO developing the output signal VO. A node and the signal it develops are referred to herein with the same name unless otherwise indicated.

The remaining channels 2-N of the regulator 100 are configured in substantially the same manner as the first channel. The PWM2-PWMN signals are provided to the gate drivers GD2-GDN, respectively, which provide signals UG2-UGN and LG2-LGN, respectively, to drive switches Q21-QN1 and Q22-QN2, respectively, each pair coupled together at corresponding phase nodes $V_{PHASE2}$-$V_{PHASEN}$ between input voltage terminals VIN1-VINN, respectively, and referenced to ground. In one embodiment, the input voltages VIN1-VINN are the same voltage level (e.g., VIN) and in an alternative embodiment, one or more phases may receive a different input voltage level. The phase nodes $V_{PHASE2}$-$V_{PHASEN}$ are coupled through respective output inductors L2-LN to the output voltage node VO developing the output voltage VO. The VO node is coupled to a load reservoir capacitor 105 and to a load 107 both referenced to a reference node, such as ground (GND). The VIN1-VINN and VO signals are fed back to the PWM controller 101. The multiple phases or channels of the multiphase regulator 100 are coupled in parallel to develop the VO signal.

The PWM controller 101 includes PWM logic 102 for providing the PWM signals PWM1-PWMN. In one embodiment, the PWM logic 102 uses PWM clock signals PCLK1-PCLKN for developing the signals PWM1-PWMN, respectively. The load 107 may include may components and devices depending upon the electronic device implemented. As shown, the load includes a device 108 receiving source power voltages VSRC and VRTN. VSRC may be equal to VO or is based on VSRC. The voltages VSRC/VRTN form a differential signal indicative of the supply voltage provided across the device 108. In one embodiment, the device 108 is a central processing unit (CPU) or other microprocessor or processing device. The regulator 100 is shown as a multiphase regulator, where it is understood that a single phase regulator is implemented using only one channel or phase. For example, a single phase regulator may include VIN1 (or VIN), PWM1, GD1, Q11, Q12, and L1, whereas VIN2-VINN, PWM2-PWMN, GD2-GDN, Q21-QN1, Q22-QN2, and L2-LN are omitted for a single phase configuration. For each phase "x", when the corresponding PWMx signal is asserted or otherwise goes high, the gate driver GDx asserts the upper gate signal UGx (e.g., asserts UGx high) to turn on the upper switch Qx1 to effectively couple the corresponding input voltage VINx to the corresponding output inductor Lx (in which "x" is an index value from 1 to N). While the upper switch Qx1 is on, the gate driver GDx de-asserts the lower gate signal LGx (e.g., asserts LGx low) to turn off the lower switch Qx2. When the PWMx signal goes back low, the gate driver GDx de-asserts the upper gate signal UGx to turn off the upper switch Qx1, and then asserts the lower gate signal LGx to turn on the lower switch Qx2. Each gate driver GDx ensures that only one of the electronic switches Qx1 or Qx2 is on at any given time. Operation repeats in this manner for each phase as controlled by the corresponding PWMx signal.

Figure 2:
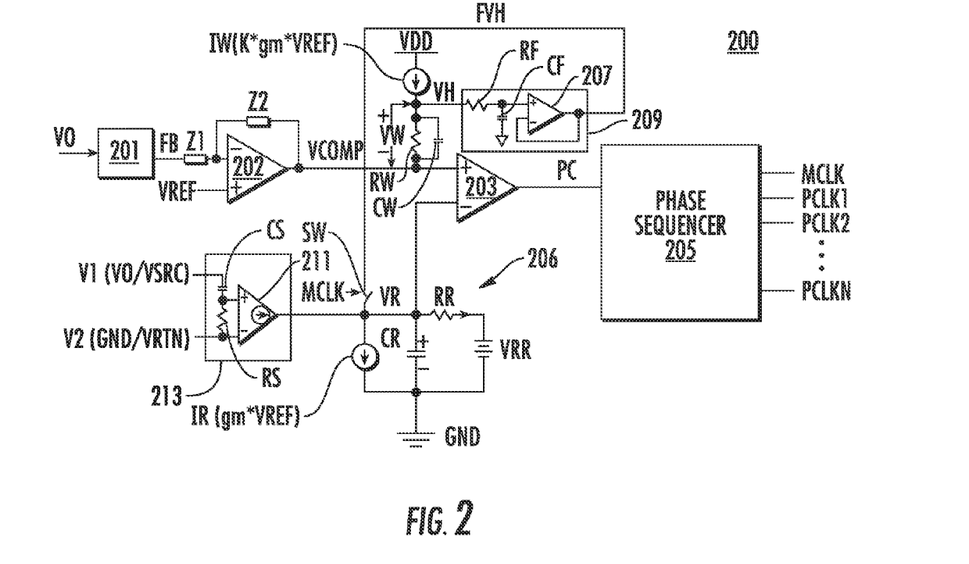
FIG. 2 is a PWM clock generation circuit implemented according to one multiphase embodiment for providing the PWM clock signals PCLK1-PCLKN within the PWM controller of FIG. 1.

FIG. 2 is a PWM clock generation circuit 200 implemented according to one multiphase embodiment for providing the PWM clock signals PCLK1-PCLKN within the PWM controller 101. The output voltage VO is provided through a feedback circuit 201 providing a corresponding feedback signal FB to one end of a first compensation impedance Z1. The other end of the first compensation impedance Z1 is provided to one end of a second compensation impedance Z2 and to the inverting input of an error amplifier 202. A reference voltage VREF is provided to the non-inverting input of the error amplifier 202, having its output coupled to a second end of the second compensation impedance Z2. The output of the error amplifier 202 develops a compensation voltage VCOMP on node VCOMP, which is coupled to a non-inverting input of a comparator 203. The inverting input of the comparator 203 receives a ramp voltage VR on a ramp node VR, and the output of the comparator 203 provides a pulse control signal PC on a node PC. As used herein, a node and the signal or voltage it carries have the same name unless noted otherwise (e.g., node VR develops the VR voltage and node PC develops the PC signal). The PC node is coupled to an input of a phase sequencer 205, which develops a master clock signal MCLK and the PWM clock signals PCLK1-PCLKN based on PC.

The PWM clock generation circuit 200 includes a window circuit including a current source IW and a window resistor RW. One end of the RW is coupled to node VCOMP and the other end is coupled to a hysteresis node VH developing a hysteresis voltage VH. The current source IW has an input coupled to a voltage supply, such as VDD, and an output coupled to node VH. The window current IW from the current source IW flows into the resistor IW to develop a window voltage VW, such that the voltage VH=VCOMP+VW. A filter capacitor CW is coupled in parallel with RW. VH is provided to the input of a filter circuit 209 having an output providing a filtered hysteresis voltage FVH on node FVH. FVH is coupled to one switched terminal of a switch SW having another switched terminal coupled to the ramp node VR. The switch SW has a control input receiving the master clock signal MCLK. In the illustrated embodiment, the switch SW is a single-pole, single-throw (SPST) switch which is open when MCLK is low and which closes while MCLK pulses high. The PWM clock generation circuit 200 includes a ramp generator 206 including a ramp current sink IR and a ramp capacitor CR coupled in parallel between the ramp node VR and GND. The ramp generator 206 includes a voltage clamp circuit including a resistor RR and a voltage source VRR, in which the resistor RR is coupled between node VR and the positive terminal of VRR, and the negative terminal of VRR is coupled to GND. The clamp circuit generally operates to prevent significant voltage deviations of the VR node.

The filter circuit 209 includes a filter resistor RF having one end coupled to node VH and the other end coupled to a filter node which is coupled to one end of a filter capacitor CF and to the non-inverting input of a buffer amplifier 207. The other end of the capacitor CF is coupled to ground and the buffer amplifier 207 has its inverting input coupled to its output which provides the FVH voltage. In the illustrated embodiment, the filter circuit 209 is a low pass filter for filtering VH and the buffer amplifier 207 provides this filtered voltage as FVH. The PWM clock generation circuit 200 further includes a current circuit 213 having inputs receiving voltages V1 and V2 and an output coupled to node VR. The voltages V1 and V2 collectively sense an output voltage condition of the regulator 100, such as VO relative to GND or VSRC relative to VRTN. VO relative to GND is the voltage output of the regulator 100 and VSRC relative to VRTN is a differential source voltage provided to the device 108. V1 is provided to one end of a capacitor CS having its other end coupled to one end of a resistor RS and to the non-inverting input of a transconductance amplifier 211. The other end of the resistor RS is coupled to the inverting input of the transconductance amplifier 211 which is further coupled to V2. The output of the transconductance amplifier 211 is coupled to node VR. The resistor-capacitor RS and CS of the current circuit 213 forms a high pass filter circuit. During steady-state conditions the capacitor CS charges to about V1-V2 and the output of the transconductance amplifier 211 goes to zero. It is noted, however, that the current circuit 213 may react to output ripple voltage during steady-state operation such that the clock frequency is modulated somewhat by VIN. A window circuit (not shown) may be incorporated into the current circuit 213 such that the current circuit 213 is non-responsive to output voltage ripple and is only responsive to load transients outside the window.

In one embodiment the reference voltage VREF is adjusted by a device in the load 107, such as the device 108, where the device adjusts VREF to modify VO based on desired operating modes or conditions. In one embodiment the current sink IR sinks a current which is proportional to VREF by a transconductance gain gm, or IR=gm*VREF (where an asterisk "*" denotes multiplication). In one embodiment the current source IW sources a current which is also proportional to VREF by the transconductance gain gm and another gain factor K, or IW=K*gm*VREF. In this manner, one or both of these currents are proportionately adjusted when VREF is modified. In alternative embodiments, VREF, IW, and IR are constant values.

In operation of the PWM clock generation circuit 200, the output voltage VO is sensed through feedback circuit 201 to provide FB, which is compared with VREF by the error amplifier 202 to develop the compensation voltage VCOMP. VREF is set at a voltage level representing a target voltage of VO. In one embodiment, the feedback circuit 201 is a voltage divider or the like such that FB has a voltage that is proportionate to VO and VREF is the target voltage of FB representing the target voltage of VO. Alternatively, VREF is equal to the target voltage level such that the feedback circuit 201 is omitted and VO is provided through Z1 to the error amplifier 202. In either case, the error amplifier 202 amplifies the difference between VREF and FB (or VO) to develop the compensation voltage VCOMP, which is used by the regulator 100 to regulate the voltage level of VO relative to GND. In one embodiment, as VO goes too high, VCOMP decreases and as VO goes too low, VCOMP increases. While MCLK is low, the switch SW is open and the current source IR discharges the capacitor CR such that the voltage VR ramps down. When VR decreases to the voltage level of VCOMP, the comparator 203 switches pulling PC high. In response to PC going high, the phase sequencer 205 asserts MCLK high which closes the switch SW. The capacitor CR is quickly charged to the voltage level of FVH, so that VR is pulled to FVH. During relatively steady state conditions, FVH is generally equal to VH which is above VCOMP by the window voltage VW. When VR rises above VCOMP, the comparator 203 pulls PC low and the phase sequencer 205 pulls MCLK low again to re-open the switch SW. The current source IR continues discharging the capacitor to ramp VR downwards for the next cycle. In this manner, the ramp voltage VR resets back to the level of FVH and then ramps down until it reaches VCOMP switching the comparator 203 and then resets back to FVH. The phase sequencer 205 pulses MCLK high to close the switch SW to reset the ramp voltage VR back to FVH, and MCLK goes back low and this process repeats for each PWM cycle.

In one embodiment, the phase sequencer 205 asserts a pulse on only one of the PWM clock signals PCLK1-PCLKN at a time in round-robin fashion for each pulse on the master clock MCLK. For example, a pulse occurs on PCLK1 for a first cycle coincident with a MCKL pulse, then on PCLK2 coincident with a MCKL pulse for the next PWM cycle, and so on up to PCLKN, and then the cycle returns to PCLK1 and continues on a repetitive basis. As noted above, N is any positive integer greater than 1 representing the number of channels or phases of the regulator 100. Each time a pulse is asserted on one of the PWM clock signals PCLK1-PCLKN, the corresponding PWM signal PWM1-PWMN is asserted high to initiate a "power stroke" for the corresponding phase. The PWM controller 101 terminates each PWM pulse according to the particular regulation method implemented.

It is advantageous to have a PWM pulse right after a load step transient (quick or sudden load increase) occurs in order to reduce the output capacitance and to reduce system cost. During a load step transient event, the output voltage VO drops causing the error amplifier 202 to increase the compensation voltage VCOMP in an attempt to bring VO back to the target voltage level established by VREF. As described further below, this generates a PWM clock with shorter delay than that which would occur during steady state operation. The compensation circuit including Z1 and Z2 has an inherent clock delay associated with how fast VCOMP can slew up. Ignoring operation of the current circuit 213, the magnitude of the slope of the ramp voltage VR is relatively fixed resulting in a significant delay from when the transient event occurred to the time the next PWM pulse is generated. Ignoring operation of the filter circuit 209, the worst case delay results when the transient occurs just when the ramp voltage VR has reset back to the level of VH, such that VCOMP must rise the largest amount before reaching VR to generate the next PWM pulse.

The delay may be reduced by designing both the error amplifier 202 and the compensation impedances Z1 and Z2 to have higher bandwidth so that VCOMP may swing upwards faster. A high bandwidth compensation configuration presents significant cost in terms of a more expensive amplifier and the compensation design costs for each implementation. Furthermore, whereas the high bandwidth compensation may solve the delay problem, it results in VCOMP overshoot during transient events. This consequently results in excessive duty cycle and the output voltage overshoots the load application, often referred to as ring back. When trying to reduce the ring back with slow compensation by reducing error amplifier bandwidth, the PWM pulse delay increases and causes the output voltage to dip during load step transient events. There is, therefore a conflict between high frequency response and middle frequency voltage dynamic regulation.

The current circuit 213 and the filter circuit 209 cooperate to significantly reduce the PWM pulse delay in response to a load step transient without causing ring back and without the additional cost of high bandwidth compensation. The current circuit 213 detects an output voltage change, such as VO relative to GND or VSRC relative to VRTN, and generates an additional discharge current for the ramp capacitor CR. During steady state conditions, the capacitor CS charges to about the voltage difference between V1 and V2 and the transconductance amplifier 211 generates little or no current at its output. In this manner, the current source IR develops a relatively constant down ramp slope of the ramp voltage VR. A sudden decrease of V1 (VO or VSRC) relative to V2 (GND or VRTN) causes the transconductance amplifier 211 to sink additional current to discharge the capacitor CR faster, which increases the down slope of the ramp voltage VR. As further described below, the increased ramp slope causes an increase in switching frequency which reduces delay from the load increase to the next PWM pulse. The additional current circuit 213 forms a separate feedback path which bypasses the compensation circuit (impedances Z1 and Z2) so that the delay associated with the bandwidth compensation is circumvented. This additional fast path is for the PWM clock generation in which the duty cycle of each PWM signal is still controlled by the error amplifier 202 and compensation circuit. In this manner, the PWM duty cycle is maintained at its proper value without ring back being induced by the additional feedback path.

The filter circuit 209 temporarily modifies the window voltage in response to a load step transient to further reduce the time delay. The compensation voltage VCOMP increases in response to a load step transient which causes a substantially similar increase of VH. The filter circuit 209, however, more slowly ramps up the upper limit of the hysteretic window voltage, or FVH, to effectively reduce the hysteretic window between VCOMP and FVH during load transient events. This reduces the ramp magnitude further while VCOMP is slewing up, which reduces the discharge time of the ramp and improves the response to the load step transient.

Figure 3:
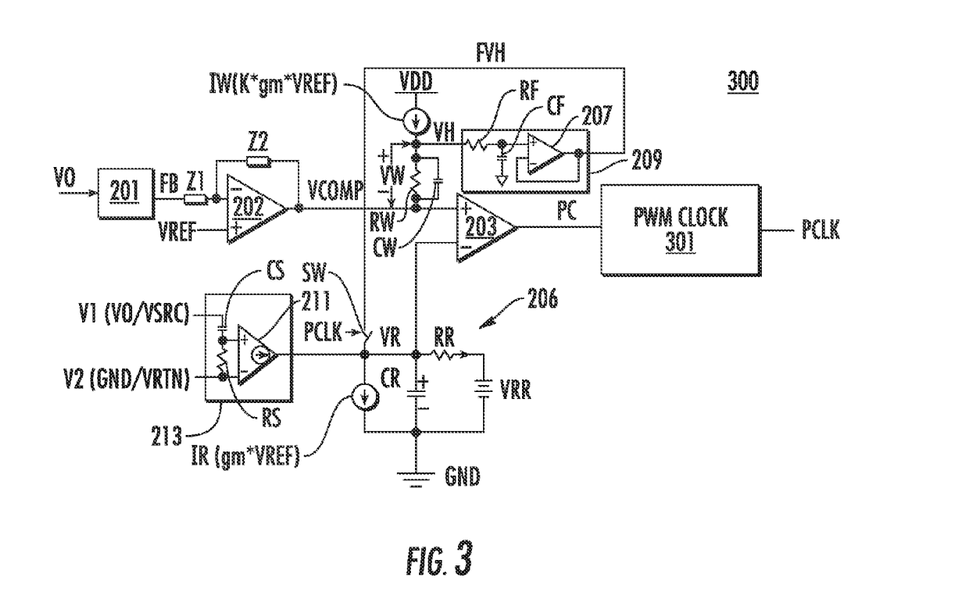
FIG. 3 is a PWM clock generation circuit implemented according to a single multiphase embodiment for providing one PWM clock signal PCLK within the PWM controller of FIG. 1.

FIG. 3 is a PWM clock generation circuit 300 implemented according to a single multiphase embodiment for providing one PWM clock signal PCLK within the PWM controller 101. The phase sequencer 205 is replaced with a PWM clock circuit 301 providing the PCLK signal. PCLK is substantially the same as MCLK previously described and is used to control the switch SW and as the sole PWM clock signal for initiating a corresponding PWM signal by the PWM logic 102. Operation of the PWM clock generation circuit 300 is substantially the same as the PWM clock generation circuit 200.

Figure 4:
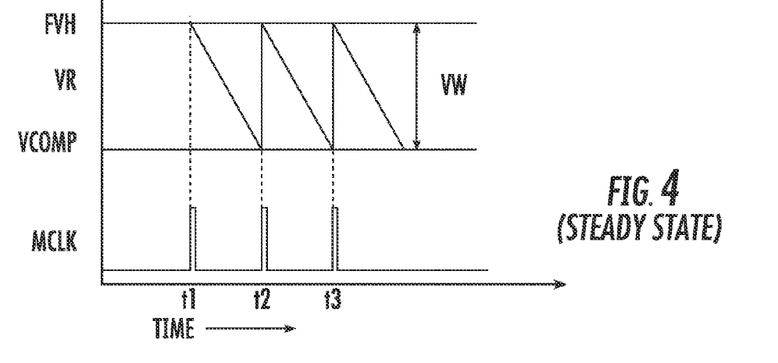
FIG. 4 is a timing diagram plotting FVH, VR, VCOMP and MCLK versus time during steady state conditions of the PWM clock generation circuit of FIG. 2 used within the PWM controller of the voltage regulator of FIG. 1 for a single or multiphase configuration.

FIG. 4 is a timing diagram plotting FVH, VR, VCOMP and MCLK versus time during steady state conditions of the PWM clock generation circuit 200 used within the PWM controller 101 of the voltage regulator 100 for a single or multiphase configuration. In this case there is either relatively low load dynamics or a steady state load so that VCOMP remains relatively steady (shown as a flat line over time). Since VCOMP changes little, if any, the filter circuit 209 acts as a buffer so that FVH follows VH and remains separated from VCOMP by VW as shown. Also, the output voltage conditions remain stable so that the current circuit 213 contributes little or no current to or from the ramp capacitor CR. A first pulse occurs on MCLK at time t1 when VR resets back to FVH. Then, VR ramps down at the steady state slope level based on current IR from the current sink IR. When VR reaches VCOMP at time t2, it resets back to FVH causing another pulse of MCLK. Operation repeats causing a third pulse on MCLK at time t3, and operation repeats in substantially the same manner over time during the steady state conditions. The pulses on MCLK are spaced apart by about the same amount of time during steady state operation.

Figure 5:
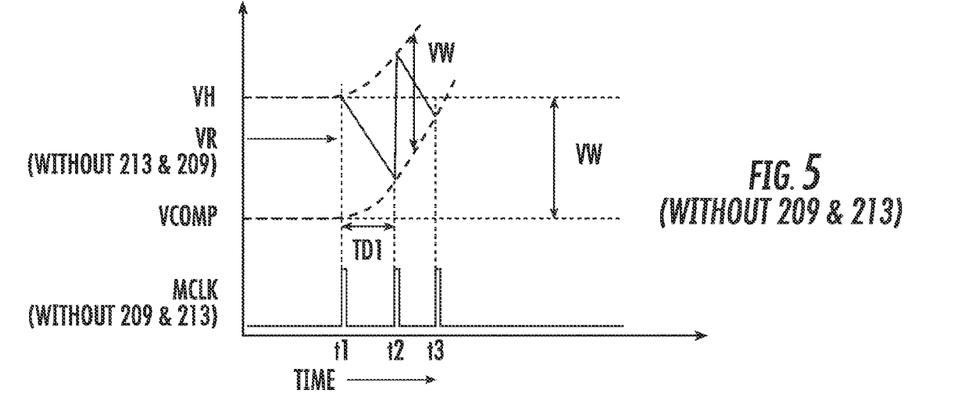
FIG. 5 is a timing diagram plotting VH, VR, VCOMP and MCLK versus time of the PWM clock generation circuit of FIG. 2 used within the PWM controller of the voltage regulator of FIG. 1 for a single or multiphase configuration, but without the effects of the filter and current circuits of FIG. 2 in response to a load step transient.

FIG. 5 is a timing diagram plotting VH, VR, VCOMP and MCLK versus time of the PWM clock generation circuit 200 used within the PWM controller 101 of the voltage regulator 100 for a single or multiphase configuration, but without the effects of circuits 209 and 213 in response to a load step transient. It is noted that the buffer amplifier 207 may still be included but without the filter circuit including RF-CF so that FIG. 5 represents that VH is fed back to the ramp generator 206 rather than FVH. Since the filter circuit 209 is effectively omitted (or otherwise its effects are ignored), the VH voltage is provided to control the upper level of the ramp voltage VR. The load step transient occurs at about time t1 just when the ramp voltage VR has reset back to VH. VCOMP rises after time t1 and VH rises with VCOMP keeping a voltage differential of VW during the increase. Since the effects of the current circuit 213 are also omitted (or otherwise its effects are ignored), the slope of the ramp voltage VR remains the same as that shown in FIG. 4 for the steady state conditions. VR finally ramps down to the rising VCOMP voltage at about time t2 causing a second pulse on MCLK, resulting in a relatively large delay time shown as TD1 between the first two pulses at times t1 and t2. As COMP and VH continue to rise, though the slope of VR remains constant, the magnitude of VR begins to decrease resulting in a slight reduction of delay time to the third pulse at about time t3. Nonetheless, it is advantageous to reduce the delay time between pulses in response to the load step transient.

Figure 6:
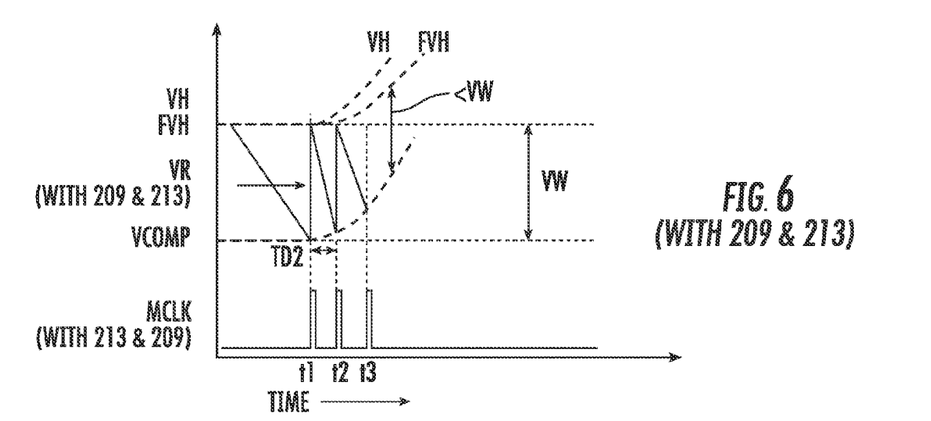
FIG. 6 is a timing diagram plotting VH, FVH, VR, VCOMP and MCLK versus time of the PWM clock generation circuit of FIG. 2 used within the PWM controller of the voltage regulator of FIG. 1 for a single or multiphase configuration, using operation of the filter and current circuits of FIG. 2 in response to the load step transient.

FIG. 6 is a timing diagram plotting VH, FVH, VR, VCOMP and MCLK versus time of the PWM clock generation circuit 200 used within the PWM controller 101 of the voltage regulator 100 for a single or multiphase configuration, using operation of circuits 209 and 213 in response to the load step transient. VH is included to illustrate the difference between VH and FVH. The load step transient occurs at about time t1 just when the ramp voltage VR has reset back to VH. VCOMP rises after time t1 and VH rises with VCOMP keeping a voltage differential of VW during the increase. Due to operation of the filter circuit 209, however, FVH rises more slowly than VH resulting in a difference between FVH and VCOMP of less than VW (shown as <VW). Although not explicitly shown, VO or VSRC drops because of the load step transient so that the non-inverting input of the transconductance amplifier 211 temporarily goes below its inverting input causing the transconductance amplifier 211 to sink additional current from node VR. This additional current sink discharges the ramp capacitor CR more quickly so that the negative slope of the ramp voltage VR increases. In this manner, VR reaches VCOMP faster causing a second pulse on MCLK at time t2 after a delay time of only TD2 as shown. The delay time TD2 is significantly less than the delay time TD1 so that the second PWM pulse occurs more quickly in response to the load step transient using the filter circuit 209 and the current circuit 213. Furthermore, at time t2 the ramp voltage VR resets back to FVH, which is less than VH, and begins ramping down just after time t2 from the lowered voltage FVH. VR ramps down at an increased rate and reaches VCOMP at time t3 causing a third pulse on MCLK. It is noted that as the regulator 100 recovers from the load step transient and the output voltage condition (VO or VSENS) increases back to its target level, the additional discharge current from the current circuit 213 decreases so that the slope of VR begins to decrease back to the steady state condition. Nonetheless, the pulses on MCLK at times t2 and t3 occur much more quickly with the filter circuit 209 and the current circuit 213 as compared to that shown in FIG. 5 without the filter circuit 209 and the current circuit 213. As the circuit recovers from the load increase operation tends back towards the steady state condition shown in FIG. 4.

It is noted that in one embodiment an opposite effect occurs in response to a decreased load step transient, such as when the load suddenly decreases. For example, in response to a decreasing load step transient, as VCOMP falls, the filter circuit 209 delays FVH relative to FH so that FVH falls more slowly actually increasing the voltage differential between VCOMP and FVH so that VR has further to travel between pulses. Furthermore, as the output load condition increases, the current circuit 213 sources current to the ramp capacitor CR so that the slope of the ramp voltage VR decreases. The net effect is that the PWM pulses are spread apart with additional delay in response to load decrease as compared to the steady state condition. These effects may be considered beneficial since it may be advantageous to incur additional delay between the PWM pulses in response to a relatively quick load decrease. In an alternative embodiment, the current circuit 213 is implemented in an asymmetric manner such that the slope of the ramp voltage VR does not decrease below a minimum ramp slope value, such as, for example, the steady state value. In this case, in response to the decreased load step transient, the ramp slope decreases to the minimum level or otherwise remains at the steady state level. In one embodiment, the current circuit 213 is made asymmetric such that it either does not source any current or otherwise sources a predetermined maximum amount associated with the minimum slope value. In another alternative embodiment, the filter circuit 209 is made in an asymmetric manner such that the window voltage between VCOMP and FVH does not increase above a maximum value in response to a decreased load step transient. In one embodiment, for example, the window voltage is capped at or just above the steady state window voltage VW. It is further noted that relatively slow changes of the load condition cause relatively small adjustments to the window voltage and slope.

Although the present invention has been described in considerable detail with reference to certain preferred versions thereof, other versions and variations are possible and contemplated. For example, the ramps and comparators can be inverted, the signals can be copied and offset for purposes of realization, the control method can be mapped into an equivalent digital control scheme, etc. The present invention is applicable to a number of synchronous and asynchronous switching regulator topologies. Further, the polarities can be interchanged for negative voltage devices and negative logic may be employed as well as positive logic. Those skilled in the art should appreciate that they can readily use the disclosed conception and specific embodiments as a basis for designing or modifying other structures for providing out the same purposes of the present invention without departing from the spirit and scope of the invention as defined by the following claims.

What is claimed is:

1. A pulse control clock generator for a voltage regulator, comprising:
   a comparator which compares a ramp voltage with a compensation voltage and which provides a corresponding pulse control signal, wherein said compensation voltage is indicative of an output voltage error;
   a window circuit which adds a window voltage to said compensation voltage to provide a hysteretic voltage;
   a filter circuit which filters said hysteretic voltage to provide a filtered hysteretic voltage, wherein a difference between said compensation voltage and said filtered hysteretic voltage is said window voltage during a steady state condition and wherein said difference is reduced in response to a change of said compensation voltage indicative of a load increase;
   a ramp circuit which provides said ramp voltage which ramps between said filtered hysteretic voltage and said compensation voltage based on said pulse control signal; and
   a current circuit which increases a slope of said ramp voltage in response to said load increase.

2. The pulse control clock generator of claim 1, wherein said filter circuit comprises a low pass filter circuit.

3. The pulse control clock generator of claim 1, wherein said filter circuit comprises:
   a resistor having a first end receiving said hysteretic voltage and having a second end coupled to a filter node;
   a capacitor having a first end coupled to said filter node and a second end coupled to a reference node; and
   a buffer having an input coupled to said filter node and an output providing said filtered hysteretic voltage.

4. The pulse control clock generator of claim 1, wherein:
   said ramp circuit comprises:
      a ramp capacitor coupled between a ramp node and ground; and
      a current sink coupled between said ramp node and ground which draws current from said ramp capacitor to reduced voltage on said ramp node; and
   wherein said current circuit sinks additional current from said ramp capacitor in response to said load increase.

5. The pulse control clock generator of claim 4, wherein said current sink draws a current proportional to an adjustable reference voltage.

6. The pulse control clock generator of claim 4, wherein said current circuit comprises a transconductance error amplifier having an input coupled to sense an output voltage condition and an output coupled to said ramp node.

7. The pulse control clock generator of claim 4, wherein said current circuit comprises:
   a capacitor having a first end coupled to an output voltage node and a second end;
   a resistor having a first end coupled to said second end of said capacitor and a second end coupled to an output reference node; and
   a transconductance amplifier having a non-inverting input coupled to said second end of said capacitor, having an inverting input coupled to said output reference node, and having an output coupled to said ramp node.

8. The pulse control clock generator of claim 1, wherein said window circuit develops said window voltage proportional to an adjustable reference voltage, and wherein said ramp circuit develops said ramp voltage having a steady state slope proportional to said reference voltage.

9. A voltage regulator, comprising:
   at least one switching circuit for converting at least one input voltage to a regulated output voltage, wherein each of said at least one switching circuit is controlled by a corresponding one of at least one pulse-width modulation (PWM) clock signal;
   an error amplifier which provides a compensation voltage indicative of error of said regulated output voltage; and
   a pulse control clock generator, comprising:
      a comparator which compares a ramp voltage with said compensation voltage and which provides a pulse control clock signal;
      PWM logic which converts said pulse control clock signal into said at least one PWM clock signal;
      a window circuit which adds a window voltage to said compensation voltage to provide a hysteretic voltage;
      a filter circuit which filters said hysteretic voltage to provide a filtered hysteretic voltage, wherein a difference between said compensation voltage and said filtered hysteretic voltage is said window voltage during a steady state condition and wherein said difference is reduced in response to a change of said compensation voltage indicative of a load increase;
      a ramp circuit which provides said ramp voltage which ramps between said filtered hysteretic voltage and said compensation voltage as controlled by said pulse control clock signal; and
      a current circuit which increases the slope of said ramp voltage in response to said load increase.

10. The voltage regulator of claim 9, wherein said filter circuit comprises a low pass filter.

11. The voltage regulator of claim 9, wherein said filter circuit comprises:
    a resistor having a first end receiving said hysteretic voltage and having a second end coupled to a filter node;
    a capacitor having a first end coupled to said filter node and a second end coupled to a reference node; and
    a buffer having an input coupled to said filter node and an output providing said filtered hysteretic voltage.

12. The voltage regulator of claim 9, wherein said ramp circuit comprises:
    a ramp capacitor coupled between a ramp node and a reference node; and
    a current sink coupled between said ramp node and said reference node which draws current from said ramp capacitor.

13. The voltage regulator of claim 12, wherein said current circuit draws additional current from said ramp capacitor in response to said load increase.

14. The voltage regulator of claim 12, wherein said current circuit comprises a transconductance error amplifier having an input coupled to sense an output voltage condition and an output coupled to said ramp node.

15. The voltage regulator of claim 12, wherein said current circuit comprises:
    a capacitor having a first end coupled to an output voltage node and a second end;
    a resistor having a first end coupled to said second end of said capacitor and a second end coupled to an output reference node; and
    a transconductance amplifier having a non-inverting input coupled to said second end of said capacitor, having an inverting input coupled to said output reference node, and having an output coupled to said ramp node.

16. The voltage regulator of claim 9, wherein:
said at least one switching circuit comprises a plurality of switching circuits each controlled by a corresponding one of plurality of PWM clock signals; and
wherein said PWM logic comprises a phase sequencer which converts said pulse control clock signal into a master clock signal and into said plurality of PWM clock signals.

17. The voltage regulator of claim 16, wherein said ramp circuit resets said ramp voltage to said filtered hysteretic voltage for each assertion of said master clock signal.

18. A method of generating a pulse control signal for a voltage generator, comprising:
comparing a ramp voltage with a compensation voltage and providing a corresponding pulse control signal, wherein the compensation voltage is indicative of output voltage error;
providing a window voltage and adding the window voltage to the compensation voltage to provide a hysteretic voltage;
filtering the hysteretic voltage to provide a filtered hysteretic voltage, wherein a difference between the compensation voltage and the filtered hysteretic voltage is the window voltage during a steady state condition and wherein the difference is reduced in response to a change of the compensation voltage indicative of a load increase;
providing said ramp voltage which ramps between the filtered hysteretic voltage and the compensation voltage; and
increasing a slope of the ramp voltage in response to a load increase of the voltage generator.

19. The method of claim 18, wherein said filtering the hysteretic voltage comprises filtering the hysteretic voltage with a low pass filter.

20. The method of claim 18, wherein said increasing a slope of the ramp voltage comprises increasing discharge of a ramp capacitor in response to the load increase.

* * * * *